Figure 1:
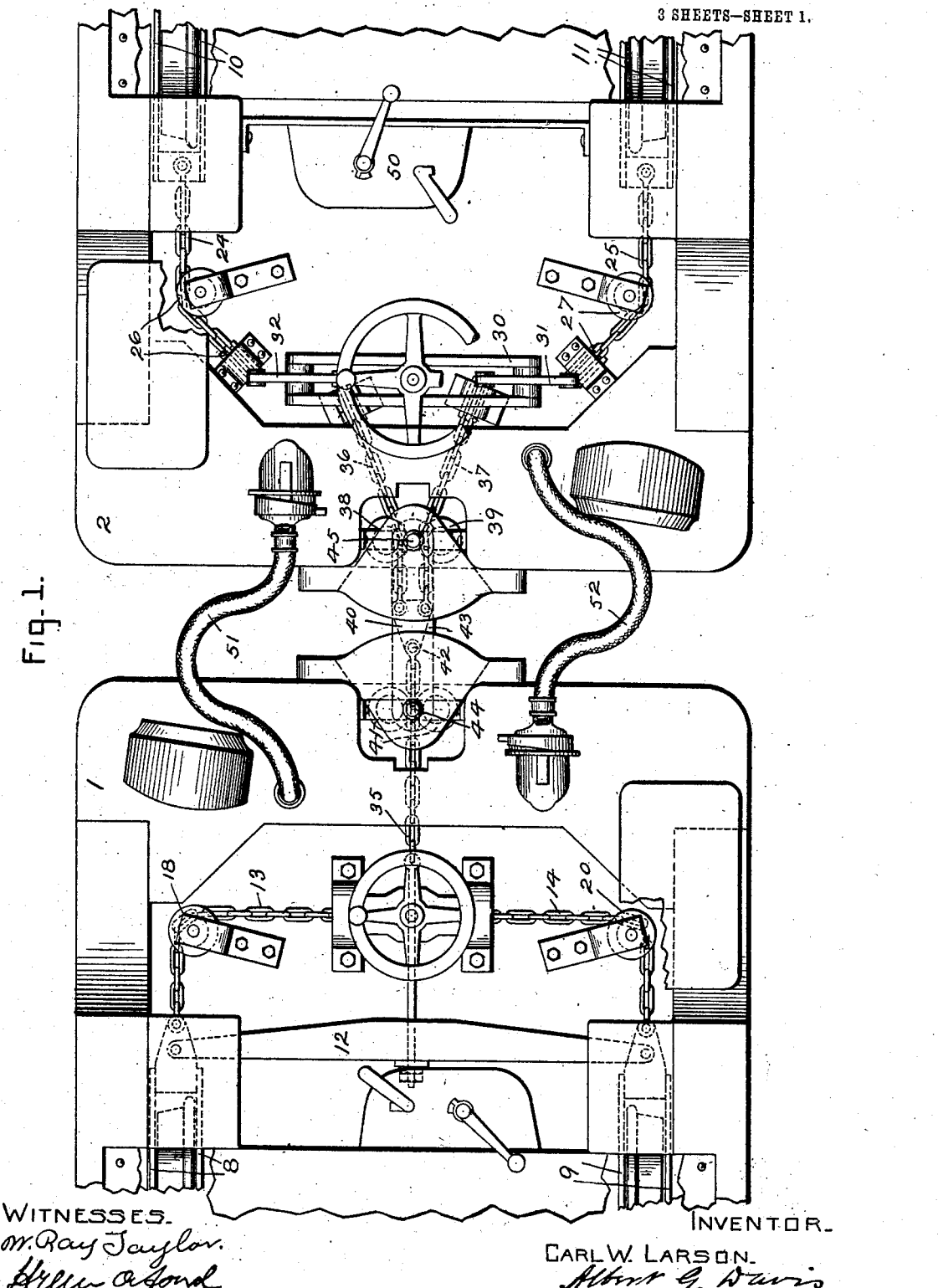

No. 840,136. PATENTED JAN. 1, 1907.
C. W. LARSON.
BRAKE SYSTEM.
APPLICATION FILED MAY 3, 1906.

3 SHEETS—SHEET 1.

WITNESSES.
W. Ray Taylor.
Helen Oxford

INVENTOR.
CARL W. LARSON.
Albert G. Davis
by.
Atty.

No. 840,136. PATENTED JAN. 1, 1907.
C. W. LARSON.
BRAKE SYSTEM.
APPLICATION FILED MAY 3, 1906.
3 SHEETS—SHEET 2.
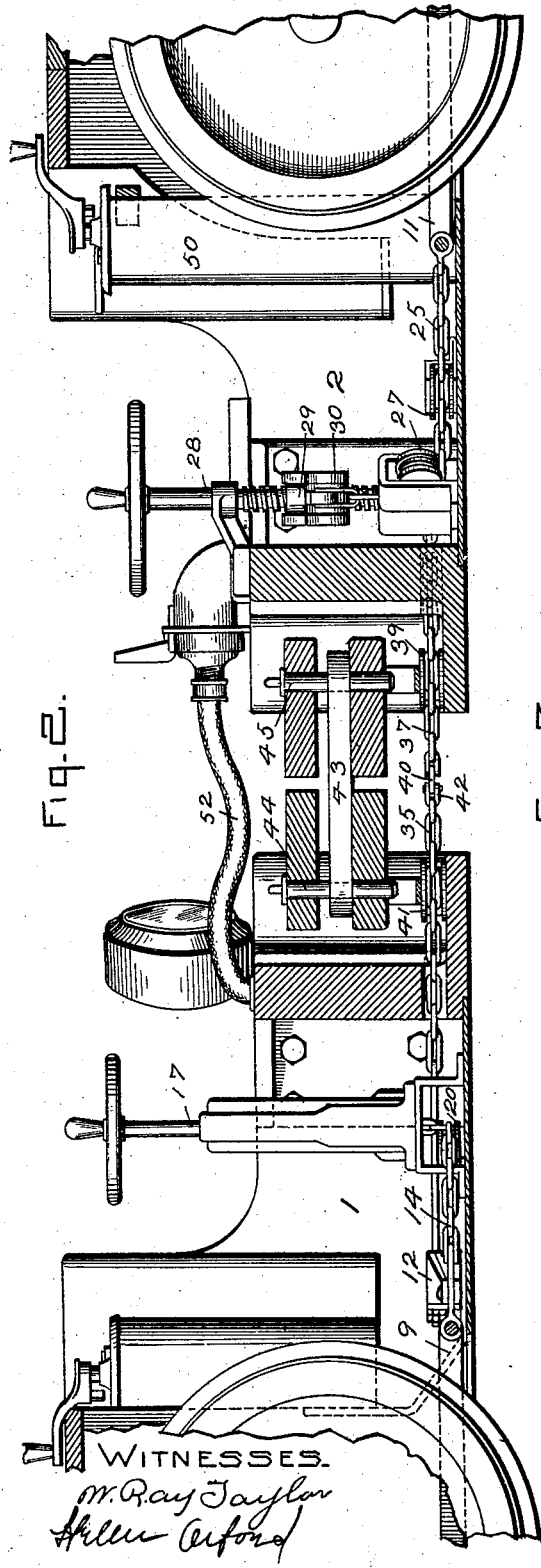
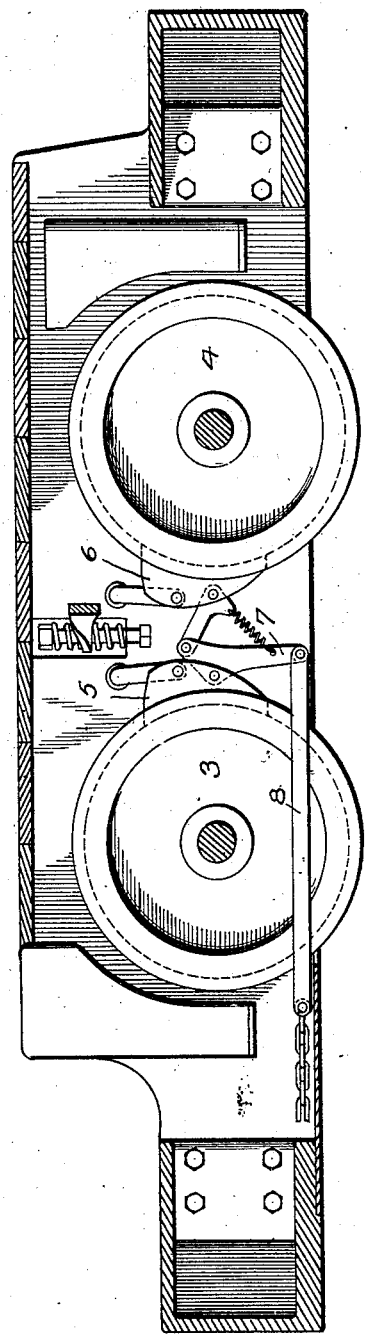
WITNESSES.
INVENTOR.
CARL W. LARSON.
Atty.

No. 840,136. PATENTED JAN. 1, 1907.
C. W. LARSON.
BRAKE SYSTEM.
APPLICATION FILED MAY 3, 1906.
3 SHEETS—SHEET 3.
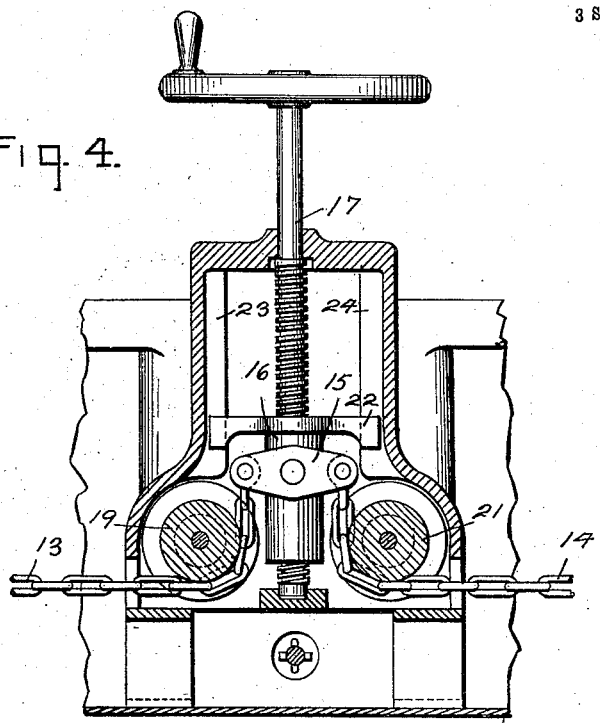
Fig. 4.
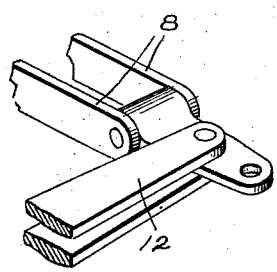
Fig. 6.
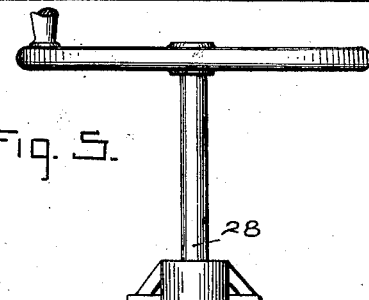
Fig. 5.
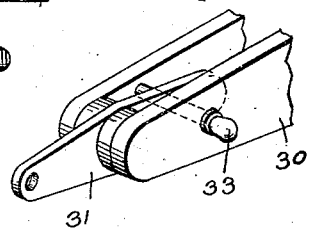
Fig. 7.
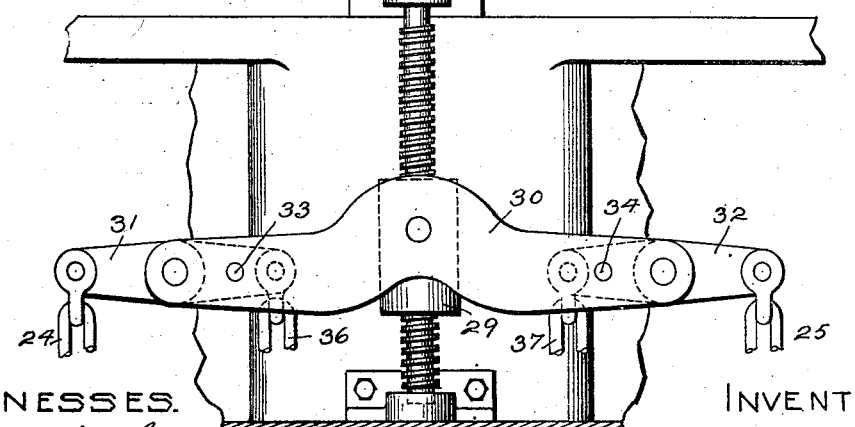
WITNESSES.
W. Ray Taylor.
Helen Oxford
INVENTOR.
CARL W. LARSON
by Albert G. Davis
Atty.

UNITED STATES PATENT OFFICE.

CARL W. LARSON, OF SCHENECTADY, NEW YORK, ASSIGNOR TO GENERAL ELECTRIC COMPANY, A CORPORATION OF NEW YORK.

BRAKE SYSTEM.

No. 840,136.     Specification of Letters Patent.     Patented Jan. 1, 1907.

Application filed May 3, 1906. Serial No. 314,976.

*To all whom it may concern:*

Be it known that I, CARL W. LARSON, a citizen of the United States, residing at Schenectady, county of Schenectady, State of New York, have invented certain new and useful Improvements in Brake Systems, of which the following is a specification.

The present invention relates to apparatus for braking vehicles, and particularly systems wherein the brakes of a plurality of vehicles are adapted to be operated from a single point. In the case of mining-locomotives, for example, the locomotives are sometimes constructed in two units which are adapted to be operated either together or singly. When operated together, it is of course desirable that the brakes on both units be subject to control from the locomotive upon which the operator is positioned.

The present invention therefore has for its object a simple and novel construction and arrangement of parts such that a plurality of brake apparatus may be properly controlled from a single point and, further, that either apparatus may be operated independently of the other.

The present invention in its various aspects will be more fully understood, and its objects and advantages will more clearly appear from the following detailed description, taken in connection with the accompanying drawings, which illustrate a preferred embodiment of the invention.

In said drawings, Figure 1 is a plan view of the adjacent ends of two locomotives having brake apparatus arranged in accordance with the present invention. Fig. 2 is a vertical cross-section of the locomotive portions shown in Fig. 1. Fig. 3 is a longitudinal section of one of the locomotives, showing the brakes-shoes and immediate operating means therefor. Fig. 4 is a cross-section through the brake-standard on one of the locomotives. Fig. 5 is a side elevation of the brake-standard for operating all of the brakes, and Figs. 6 and 7 show details.

Reference being had to the drawings, 1 and 2 indicate mining-locomotives, although the present invention is applicable to other vehicles. Each locomotive has wheels 3 and 4, against which brake-shoes 5 and 6 are adapted to be pressed by means of lever mechanism 7. The particular arrangement of brake-shoes and immediate operating mechanism, however, constitutes no part of the present invention and may be varied in any desired manner. The lever mechanisms for applying the brake-shoes on locomotive 1 are actuated by bars or links 8 and 9, while on locomotive 2 similar links or bars 10 and 11 control the brake-actuating levers. The links 8 and 9 are connected together by an equalizing member 12 and are also connected by means of chains 13 and 14 to an equalizing lever or member 15, which is mounted upon a nut 16. The nut coöperates with screw-threads upon a brake-staff 17, so that when the staff is rotated the nut moves vertically and draws upon the chains 13 and 14, which pass under suitable guide wheels or pulleys 18, 19, 20, and 21. The nut is held against rotation by means of a cross-head 22 on the nut, which engages fixed guides 23 and 24. As the outer ends of the chains are drawn upward the links 8 and 9 are carried backward, the brakes applied, and the pressure equalized through the lever 15. It will therefore be seen that when locomotive 1 is being operated singly the brakes are applied through the staff 17 and the equalizing member 12 remains idle.

On locomotive 2 chains 24 and 25, corresponding to chains 13 and 14, are connected at their one end to the links 10 and 11 and after passing around suitable guide-pulleys 26 and 27 are fastened to a mechanism operated by the staff 28. This mechanism consists of a nut 29, corresponding to the nut 16 and having pivotally supported thereon a main equalizing-lever 30. Auxiliary levers 31 and 32 are pivotally supported upon opposite ends of the lever 30. The chains 24 and 25 are connected to the outer end of the levers 31 and 32, respectively. When locomotive 2 is being operated alone, pins 33 and 34 are passed through the levers 31 and 32, respectively, and through the main equalizing-lever, so that the three levers are connected into one rigid whole. Then when the staff 28 is turned the nut 29 is raised and by drawing upon the chains 24 and 25 causes the brakes to be applied and the stresses to be equalized in the same manner that this is done in the other locomotive.

When the two locomotives are coupled together, the two sets of brakes are controlled from the staff 28, and to this end a chain 35 is connected to the center of the equalizing member 12 on locomotive 1, and short chains 36 and 37 are connected to the inner ends of the levers 31 and 32 on locomotive 2. The chains 36 and 37 pass over pulleys 38 and 39 and have their outer ends connected to a plate 40. The chain 35 passes between a set of pulleys 41 and is adapted to be connected to the plate 40 by means of a clevis 42. The pins 33 and 34 are removed, and then upon operating the brake-staff 28 the main equalizing-lever is drawn upward, and the brakes on locomotive 2 are applied by chains 24 and 25 and those on locomotive 1 by the equalizing member 12 and chains 35, 36, and 37. During this operation the stresses are equalized not only between the various shoes on each locomotive, but between all of the shoes considered collectively.

The locomotives are coupled together by means of a link 43, through the ends of which are passed coupling-pins 44 and 45, respectively. The pulleys 38 and 39 are arranged substantially beneath the coupling-pin 45, and the pulleys 41 are similarly situated with respect to the pin 44. Thus it will be seen that the distance between pulleys 41 and the pulleys 38 and 39 remains fixed regardless of whether the locomotives are standing upon a curve or upon a straight track. Therefore the angular position of the locomotives with respect to each other does not in any way affect the application of the brakes, and they may be applied as effectively on a curve as on a straight track.

During the tandem operation of the locomotives the motors of both locomotives are governed by the controller 50 on locomotive 2. This controller is connected to the motor equipment on locomotive 1 by means of jumpers 51 and 52, which may be readily coupled and uncoupled. When operating alone, the motors of each locomotive are governed by the local controller.

While I have described in detail the preferred form of my invention, it is of course understood that various changes may be made in the details of construction and organization of parts without departing from the invention, and in the appended claims I intend covering all such changes.

What I claim as new, and desire to secure by Letters Patent of the United States, is—

1. In a multiple-unit brake system, a brake apparatus including an equalizer, a second brake apparatus a lever pivoted at its center and having auxiliary centrally-pivoted levers mounted on the ends thereof, a connection between one end of each of said auxiliary levers and the said equalizer, and a connection between the other ends of said auxiliary levers and the second brake apparatus.

2. In a multiple-unit brake system, a brake apparatus including an equalizer, a second brake apparatus, a brake-shaft, a member screw-threaded upon said shaft for operation thereby, a main lever pivoted at its center to said member, auxiliary levers centrally pivoted on the ends of said main lever, a connection between one end of each of said auxiliary levers and said equalizer, and a connection between the other ends of said auxiliary levers and the second brake apparatus.

3. In a multiple-unit brake system, a pair of vehicles each having brake apparatus, an operating member on one of the vehicles, a main lever pivoted at its center on said operating member, auxiliary levers pivoted at their centers on the ends of said main lever a connection between one end of each auxiliary lever and the brake apparatus on one vehicle, and a connection between the other end of each auxiliary lever and the brake apparatus on the other vehicle.

4. In a multiple-unit brake system, a pair of vehicles each having brake apparatus, a brake-staff on one of the vehicles, a member screw-threaded upon said brake-staff for operation thereby, a main lever pivoted at its center upon said member, auxiliary levers pivoted at their centers on the ends of said main lever, a connection between one end of each auxiliary lever and the brake apparatus on one vehicle, and a connection between the other end of each auxiliary lever and the brake apparatus on the other vehicle.

5. In a multiple-unit brake system, a vehicle having brake apparatus including an equalizer together with means for operating said apparatus independently of the equalizer, a second vehicle having brake apparatus, a brake-staff on said second vehicle, a member operated by said staff, a main lever pivoted at its center upon said member, auxiliary levers pivoted at their centers upon the ends of said main lever, a connection between one end of each of said auxiliary levers and the said equalizer, and a connection between the other ends of said auxiliary levers and the brake apparatus on the second vehicle.

6. In a multiple-unit brake system, a pair of vehicles, each having brake apparatus including horizontally-arranged flexible actuating devices, a brake-staff on one of said vehicles, a member adapted to be moved vertically by said staff, a main lever pivoted at its center on said member, auxiliary levers pivoted at their centers upon the ends of said main lever, guides for said flexible devices beneath the ends of said auxiliary levers, and means connecting said flexible devices to the ends of said auxiliary levers.

7. In a multiple-unit brake system, a pair of vehicles, a coupling-link pivoted at its ends to said vehicles, brake apparatus upon each vehicle, a flexible connection between said brake apparatus, and guides for said connections on each vehicle arranged in vertical alinement with the pivots between the coupling-link and the vehicle.

8. In combination, a vehicle having a brake apparatus, a second vehicle having a brake apparatus, a brake-staff on the second vehicle, a member arranged to be operated thereby, a main lever pivoted at its center upon said member, auxiliary levers pivoted at their centers upon the ends of the main lever, connections between corresponding ends of the auxiliary levers and the brake apparatus of the second vehicle, means for connecting the other ends of said auxiliary levers to or disconnecting them from the brake apparatus in the other vehicle, and means for locking said auxiliary levers in fixed positions on said main lever.

In witness whereof I have hereunto set my hand this 2d day of May, 1906.

CARL W. LARSON.

Witnesses:
BENJAMIN B. HULL,
HELEN ORFORD.